Nov. 1, 1960  L. D. DAVIS, JR., ET AL  2,958,396
ROTOR BRAKE
Filed Sept. 6, 1956  2 Sheets-Sheet 1

Witness:
Richard W. Carpenter

INVENTORS.
Louis D. Davis, Jr.
Edward J. Simanek
Carl E. Jack
By Walter E. Schlegel, Jr. Atty.

Nov. 1, 1960     L. D. DAVIS, JR., ET AL     2,958,396
ROTOR BRAKE
Filed Sept. 6, 1956     2 Sheets-Sheet 2
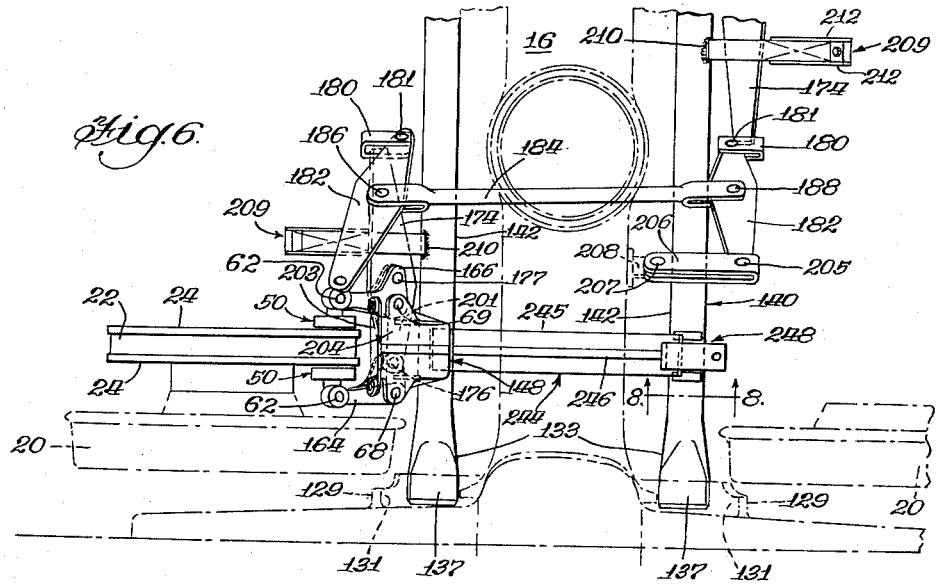
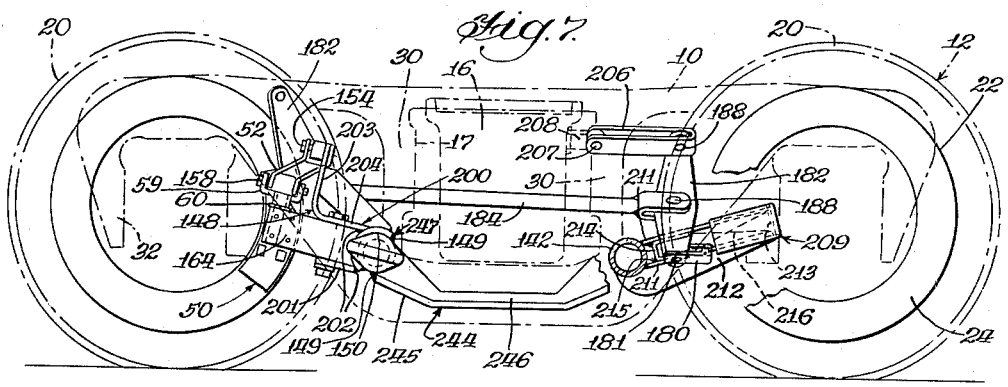
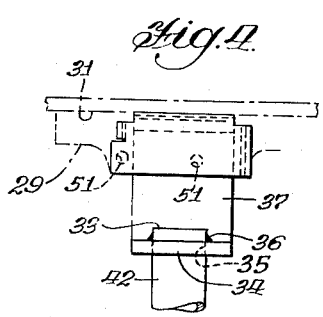
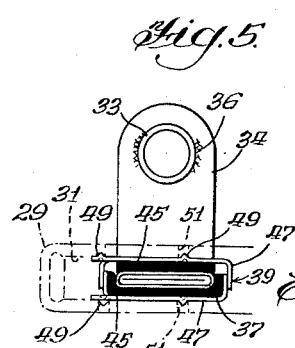
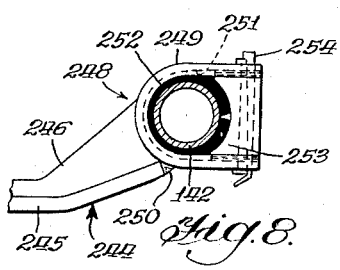
INVENTORS.
Louis D. Davis, Jr.
Edward J. Simanek
Carl E. Tack
By Walter F. Schlegel, Jr. Atty.
Witness:
Richard W. Carpenter

United States Patent Office 2,958,396
Patented Nov. 1, 1960

2,958,396

ROTOR BRAKE

Louis D. Davis, Jr., Chicago, Edward J. Simanek, Homewood, and Carl E. Tack, Chicago, Ill., assignors to American Steel Foundries, Chicago, Ill., a corporation of New Jersey Filed Sept. 6, 1956, Ser. No. 608,290

12 Claims. (Cl. 188—33)

This invention relates to brake arrangements and more particularly to a rotor brake arrangement for a railway car truck.

The invention comprehends a rotor brake mounting and linkage arrangement which will permit the use of a single power unit mounted externally of the car truck to actuate both of the brake mechanisms on each of the car trucks.

In conventional rotor brake arrangements, a separate power cylinder is mounted immediately adjacent each rotor or friction member for direct connection to the brake mechanism associated with the rotor. Thus the cost of applying standard rotor brake arrangements to a railway car is materially increased by the necessity of providing a plurality of power units for each truck rather than a single power unit for all the brakes on both trucks as is the case with the conventional freight car tread brake systems. Because the higher the cost of individual cylinders customarily employed on passenger equipment makes such a rotor brake uneconomical for freight use, it is desirable to provide a less expensive arrangement which will make off-tread braking more practical for use on freight equipment.

It is, therefore, a primary object of this invention to provide a rotor brake arrangement of simple design and construction and wherein a plurality of individual rotor brake mechanisms on separate trucks of a railway car can be actuated by a common power unit mounted on the car externally of the trucks.

Another object of the invention is the provision of a linkage arrangement connecting a plurality of separate rotor brake mechanisms mounted on one truck with each other and with a common power source.

Another object of the invention is the provision of a brake arrangement wherein a plurality of brake mechanisms are rigidly mounted on a generally H-shaped support, the ends of which are resiliently carried in pockets of the side frames.

A more specific object of the invention is the provision of a brake mounting arrangement including a pair of transversely extending brake unit supporting beams disposed adjacent separate wheel and axle assemblies and interconnected by at least one longitudinally extending bar or arm capable of transmitting braking stresses and forces between the beams.

These and other objects and advantages of the invention will be apparent from an examination of the following specification and accompanying drawings, wherein:

Figures 4 and 5 are fragmentary top plan and side elevational views, respectively, illustrating the novel mounting arrangement for the support in the side frame pocket;

Figure 6 is a fragmentary top plan view similar to Figure 1 but illustrating a modified form of my invention;

Figure 7 is a side elevational view of the structure illustrated in Figure 6 with portions of the structure removed, and Figure 8 is a fragmentary sectional view taken on line 8—8 of Figure 6.

Figure 1:
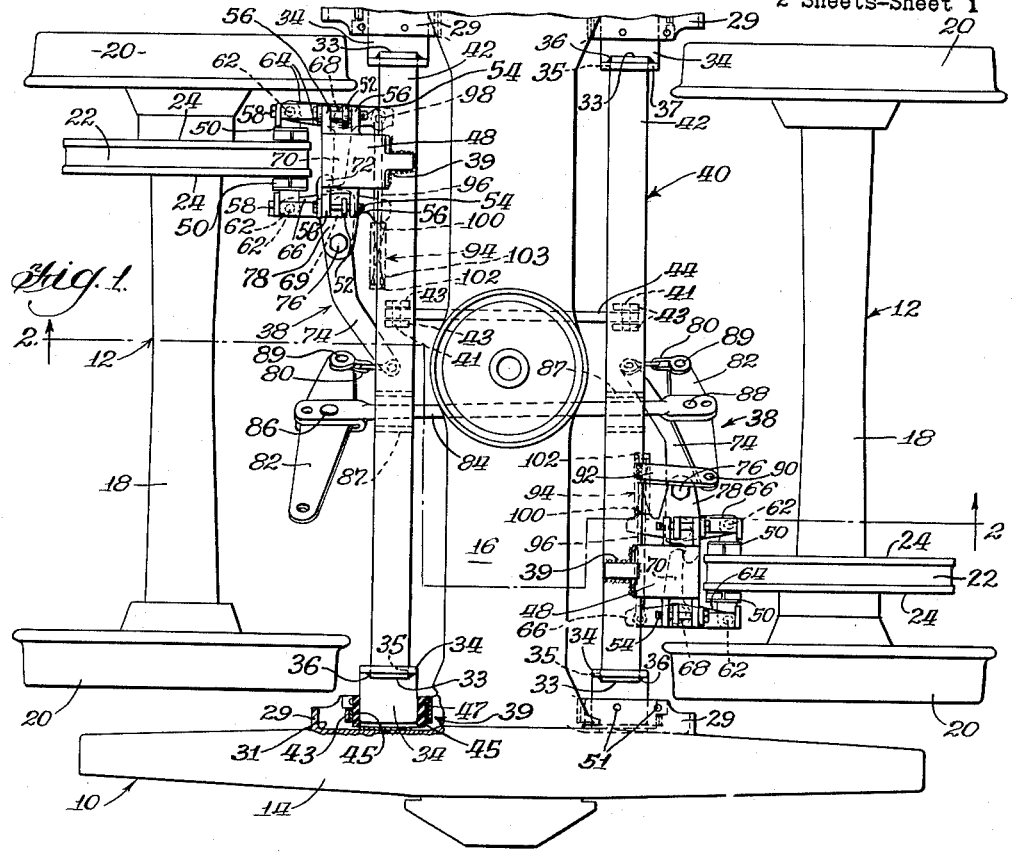
Figure 1 is a fragmentary top plan view, partially in horizontal section, of a railway car truck embodying features of my invention.

It will be understood that certain elements have been intentionally omitted from certain views where they are illustrated to better advantage in other views.

Referring now to the drawings for a better understanding of the invention, it will be seen that the novel brake arrangement is shown as applied to a railway car truck comprising a frame indicated generally at 10 which is supported by a pair of spaced wheel and axle assemblies indicated generally at 12.

The frame 10 is shown as including a pair of parallel side frames 14 (only one of which is shown) spaced from each other and interconnected by a transversely extending bolster 16, the ends of which may be resiliently mounted in side frame openings 17 in a manner familiar to those skilled in the art. Each wheel and axle assembly 12 comprises an axle 18 having a pair of wheels 20 and a rotor or friction member 22 secured thereon. Each rotor 22 presents a pair of rotatable friction surfaces 24 disposed on opposite sides thereof.

Figure 2:
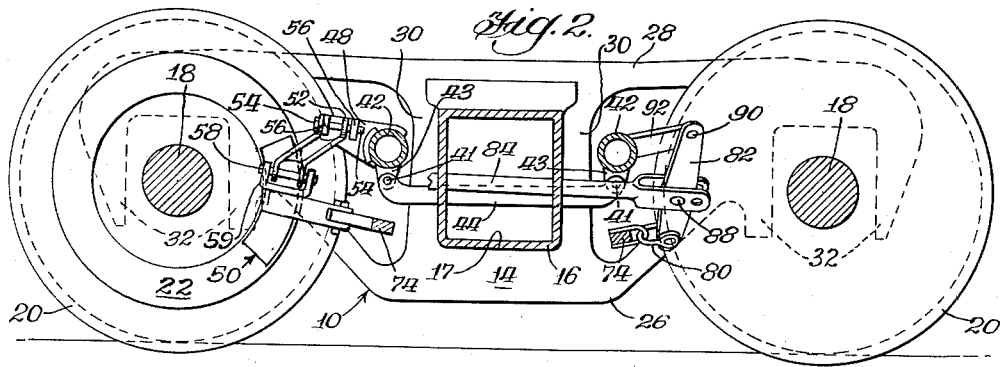
Figure 2 is a fragmentary sectional view taken along line 2—2 of Figure 1 with portions of the structure removed.
Figure 3:
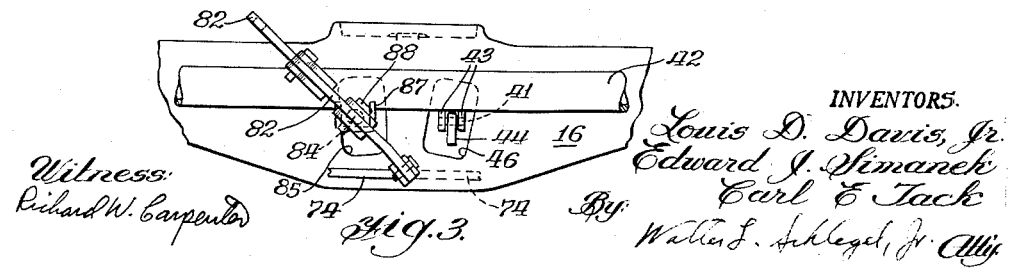
Figure 3 is a fragmentary end elevational view of a portion of the structure illustrated in Figure 1, with the wheel and axle assembly removed.

The side frames 14, as best seen in Figure 2 of the drawings, each comprises tension and compression members 26 and 28, respectively, which are interconnected, intermediate their ends, by a pair of columns 30. The members merge with each other at their ends and present depending pedestal jaws 32 adapted to seat on journal boxes (not shown) in which are journaled the ends (not shown) of axles 18. The side frames are provided at their inboard sides with integrally formed inboardly extending flanges 29 which present generally longitudinally extending and preferably diagonally disposed slots or pockets 31 therein.

The brake mechanisms indicated generally at 38, associated with the rotors of the respective assemblies, are carried by a substantially H-shaped supporting member indicated generally at 40 which comprises a pair of preferably cylindrically shaped transversely extending beams 42 interconnected intermediate their ends by a stabilizer or spacer bar 44 disposed to extend longitudinally of the truck through co-aligned apertures 46 of the bolster 16 and preferably pivotally secured by pins 41 at its ends to lugs 43 depending from the respective beams 22.

The bar 44 serves as a spacer between the beams 42 so that as the side frames and beams angle vertically or horizontally with respect to each other, the beams and linkage carried thereby are maintained in substantially uniform relationship to each other.

Although in the embodiment of the invention illustrated in Figures 1 and 2 of the drawings, the bar 44 is shown as being pivotally interconnected between the respective beams 42, the bar may be rigidly connected between the beams in any desired manner. If the connection is rigid, the bar in addition to functioning as a spacer or stabilizer will also be operable to transmit from one beam to the other many of the horizontal forces generated by the levers of the linkage.

Also rigid connections between the arm 44 and respective beams will enable the arm to transmit braking torque from one beam to another where it can be ultimately taken up by the side frames.

The ends 33 of each beam 42 are provided with depending brackets 34 presenting apertures 35 in which the ends 33 are received. The brackets 34 are rigidly secured to the beam ends 33, as by welds 36, and may therefore be considered as integral portions of the beams. Each bracket 34 presents at its lower extremity an outboardly extending generally elongated flat lug or boss 37 adapted for receipt in the slot 31 of a related side frame flange 29. The slots 31 are preferably diagonally disposed so that beams 42 can be replaced by conventional brake beams such as in the arrangement described in U.S. Patent No. 2,508,020.

As best seen in Figures 4 and 5, the brake beam bracket lugs 37 are resiliently retained in the side frame flange slots 33 by means of readily demountable resilient clip assemblies indicated generally at 39. The assembly comprises a pair of upper and lower resilient pads 45 and a pair of generally U-shaped metal clips 47. The pads 45 are disposed to surround the lug to form a sleeve or bushing. Although a single rubber sleeve can be employed, the use of separate pads facilitates assembly of the device. The clips 47 are disposed in oppositely facing directions to form a metal sleeve over the resilient sleeve formed by the rubber pads. After the pads and clips have been applied to the lugs 37, the entire unit is inserted into the slots 31 and retained therein by means of the nubs 49, formed on the outer sides of the clips 47 and which seat in apertures 51 of side frame flanges 29. Thus it will be seen that the novel mounting unit affords resilient support for the ends of the brake support. To assemble the device, corresponding ends of the beams are inserted in related pockets of one side frame and then the other side frame is applied, with the opposite corresponding ends of the beams being inserted in related pockets of the other side frame.

As best seen in Figure 1, the rotors 22 of the respective assemblies 12 and the brake mechanism 38 associated therewith are preferably positioned at diagonally opposite corners of the truck. Each brake mechanism 38 is supported by a brake frame or housing 48 which may be nonrotatably secured as by welds 39 to an adjacent beam 42 and disposed inwardly adjacent the related rotor 22.

Disposed adjacent the opposite sides of each rotor 22 for engagement with the respective friction surfaces 24 are a pair of brake shoe assemblies 50 which may be supported from the brake frame 48 by a pair of generally vertical brake hangers 52 pivotally connected at their upper ends by pins 54 to inboardly and outboardly extending brake frame lugs 56 and at their lower ends by pins 58 to generally U-shaped brackets 59.

The brake shoe assemblies 50 may be pivotally connected to the respective outer ends of outboard and inboard substantially horizontal brake levers 64 and 66 by means of generally vertically disposed pins 62 which extend through horizontal brake head lugs 60 and brake head brackets 59. Thus pins 62 serve to secure both the hanger brackets 59 and the brake levers to the respective brake heads.

The outboard and inboard brake levers 64 and 66 are fulcrumed intermediate their ends to the frame 48 by pins 68 and 69, respectively.

The medial portion of outboard brake lever 64 is provided with an inboardly extending lug 70 which is abuttably engageable with lug 72 extending outboardly from the end of a substantially horizontal extending actuating lever 74, the actuating lever being fulcrumed inboardly adjacent its outboard end to the brake frame by common fulcrum pin 69 and connected intermediate its ends by pin 76 to an inboardly extending lug 78 of inboard brake lever 66.

It will be understood that the specific structural details of the brake frames and the pivotal connections of the brake levers thereto are not shown in great detail as they do not form an essential part of this invention. However, the brake lever arrangement shown in Figure 1 is illustrated in greater detail than copending application, Serial No. 496,698 filed March 25, 1955, in the name of Carl E. Tack and Louis D. Davis, Jr.

This invention is primarily concerned with the linkage arrangement for operating the independent brake mechanisms associated with the separate wheel and axle assemblies and with the novel H-shaped brake support comprising the transversely extending beams having their ends resiliently carried by the side frames and being interconnected by torque extending between the brake beams. Thus, for purposes of this, we are only concerned with that portion of the linkage that extends between the power source and the actuating levers 74.

The inboard ends of the actuating levers 74 associated with the respective brake mechanisms 38 may be connected to links 80 which in turn are connected to the lower ends of a pair of operating levers 82 disposed on opposite sides of support member 40. The operating levers 82 in turn may be interconnected intermediate their respective ends by a compression rod 84 extending longitudinally of the truck through co-aligned apertures 85 in the bolster and preferably supported adjacent its ends by a pair of generally U-shaped guide brackets 87 rigidly secured to and depending from the respective beams 42 adjacent the bolster apertures 85. The rod 84 is pivotally connected at its ends to the left and right hand operating levers by pins 86 and 88, respectively. As best seen in Figure 2, the upper end of the right hand operating lever is connected by pin 90 to a fulcrum lug 92 rigidly secured to and extending outwardly from the right hand beam 42. The upper end of the left hand operating lever may be connected in any manner as by a cylinder rod or connecting rod (not shown) to a power source (not shown) mounted on the car externally of the truck.

The inner extremities of the brake levers 64 and 66 may be provided with a release spring mechanism indicated generally at 94 which comprises a spring guide 96 secured as at 98 to the outboard lever and extending through an aperture 100 of the inboard brake lever and a preferably helical compression spring 103 sleeved on the guide bar between the inboard lever 66 and a spring seat 102 formed on the inboard end of the spring guide 96.

To describe the operation of the invention, it will be seen that as the upper extremity of the left hand operating lever 82 is urged to the right from an external power source (not shown), the lever will rotate counterclockwise about pin 86, as seen in Figure 1, and its lower extremity will cause the left hand actuating lever 74 to rotate clockwise about pin 69 and carry the inboard brake lever and related brake shoe assembly into engagement with the inboard friction surface 24 of the rotor and at the same time urge the outboard brake lever through the engagement between the lugs 70 and 72 to rotate counterclockwise about pivot 68 and bring the outboard brake shoe assembly into engagement with it related friction surface. As the brake shoe assemblies engage the left rotor, the pivotal point of left operating lever 82 shifts to pin 89 and the lever continues to rotate counterclockwise urging the right hand operating lever, through the compression rod 84, to rotate clockwise, as seen in Figure 1, about pivot 90 and thereby actuate the brake mechanism associated with the rotor of the right hand wheel and axle assembly. Upon de-energization of the power source, release spring assembly 94 will urge the brake levers and brake shoe assemblies to move away from their related rotors.

Thus it will be understood that in our arrangement we have not only provided a stabilized brake supporting structure resiliently carried by the side frames and wherein the stresses incurred in the linkage can be transmitted between the beams by means of the bar connected therebetween, but we have also provided a novel linkage arrangement which permits the use of a single power unit to actuate a plurality of separate rotor brake mechanisms mounted on the novel supporting structure.

A modified form of our invention is illustrated by Figures 6–8 of the drawings, wherein elements of the structure corresponding to elements of the first described embodiment are designated by similar or corresponding numerals.

In this arrangement as in the previously described embodiment, the ends 133 of each beam 142 are provided with brackets having lugs 137 received in slots 131 presented by side frame bosses or flanges 129.

The primary difference between the separate embodiments is that in the form of our invention illustrated in Figures 6–8, the beams are positioned below the plane of the rotational axes of the wheel and axle assemblies and are interconnected by a pair of bars 244 which are disposed to extend under the bolster 16. By reason of the lower position of the beams 142, the brake frame 148 also differs in shape from brake frame 48 employed in the first described embodiment.

Each torque transmitting arm or stabilizing bar 244 is preferably in the form of an inverted T, as seen in vertical cross-section, and comprises a generally flat horizontal strip 245 inclined upwardly at its ends and preferably reinforced by an upstanding longitudinally extending vertical rib 246.

The opposite ends of each arm 244 are secured to the respective beams 142 by rigid and flexible connections 247 and 248, respectively. The rigid connection 247 between each arm 244 and its related beam 142 is preferably located at the same place where the brake frame 148 is secured to the beam, while the resilient connection 248 is preferably located at a place on the other beam 142 which is spaced from the other brake frame 148.

An enlarged detail view of the flexible or resilient connection 248 is illustrated in Figure 8. A generally U-shaped guide 249 is rigidly secured to the end of the arm 244 as by weld 250 and presents a channel or slot 251 which is semi-cylindrical at its closed end. The beam 142, having an outer resilient sleeve or bushing 252 preferably formed of rubber, is positioned within the guide slot 251 and firmly secured therein by means of a lock block 253 positioned within the slot 251 against the beam 142. The block is firmly secured in position in snug abutment with the beam 142 by a pair of oppositely tapered wedges 254 disposed to extend vertically through aligned apertures of the guide 249 and lock block 253. Thus it will be seen that a firm yet resilient connection is achieved between the arm and the beam.

The other end of the arm 244 is rigidly secured to the other beam 142 and to a brake frame 148 by the rigid connection 247. The frame 148 and arm 244 each present partly-cylindrical cavities which abut opposite sides of the beam 142 and are rigidly secured thereto as by welds 149.

The frame 148, as best seen in Figures 6 and 7, comprises a generally semicylindrical sleeve 150 having a pair of vertically spaced brackets 200 and 201 rigidly secured thereto as by welds 202 and extending outwardly therefrom in generally parallel horizontal planes. The upper bracket 200 is generally L-shaped, as seen from the side, and comprises plates 203 and 204 disposed generally at right angles to each other.

The brake mechanism and linkage is substantially as previously described and comprises a pair of rotors 22 secured to the respective wheel and preferably positioned at diagonally opposite corners of the truck opposite the respective brake frames 148. Each rotor 22 presents oppositely facing friction surfaces 24 which are engaged by a pair of brake shoe assemblies 50, presenting lugs 60 which are connected by vertical pins 62 to U-shaped brackets 59 and the outer ends of respective brake levers 164 and 166, respectively. The brake shoe assemblies are each carried by a pair of hangers 52 pivotally connected at their lower ends by pins 158 to brackets 59 and pivotally connected at their upper ends by pins 154 to the brake frame vertical plate 203.

In this embodiment the outboard and inboard brake levers 164 and 166, respectively, are preferably in the form of bell cranks being fulcrumed intermediate their ends by pins 68 and 69 to brake frame plate 204. The horizontal actuating lever 174 is fulcrumed intermediate its ends by common pivot pin 69 to the plate 204 and is pivotally connected to the brake levers 164 and 166 by pins 176 and 177, respectively. The inboard ends of the actuating levers 174 are provided with links 180 which are pivotally connected by pins 181 to the lower ends of the respective operating levers 182 which in turn are interconnected intermediate their ends by a compression rod 184. As seen in Figure 6, the left hand operating lever 182 is a live lever operatively connected (not shown) to a power source (not shown) located externally of the truck, whereas the other operating lever 182 is a dead lever having its upper end pivotally connected by pin 205 to a link 206 which is in turn pivotally connected by pin 207 to a lug 208 formed on the bolster 16. The link 206 may be welded to the adjacent beam 142, if desired, as illustrated in Figure 1 of the drawings.

Additionally, a pair of supports or guides 209 may be provided for the actuating lever 174. The guides 209 are rigidly secured to the respective beams 142 and extend outwardly therefrom. Each support 209 preferably comprises a pair of vertically spaced plates 211 interconnected by a pair of horizontally spaced plates 212 to form a spring pocket 213 therebetween. At the inner end of the support, a generally U-shaped spacer 214 may be rigidly secured, as by welds 215, between the plates 211. The actuating levers 174 may be disposed to extend through the spacers 214 so as to be supported and guided thereby.

In order to provide an automatic release of the engagement of the brake shoe assemblies, compression springs 216 may be disposed in the pockets 213 to react between the supports and the respective actuating levers 174.

In operation, this embodiment is similar to the first described embodiment relative to the linkage. However, in addition to their function as spacers, the bars 244 also serve to transmit brake torque between the beams, while the resilient connection at one end of each torque transmitting arm affords the flexibility necessary for the support to permit the side frames to shift vertically and horizontally relative to each other during normal operation.

We claim:

1. In a rotor brake arrangement for a railway car truck comprising a pair of spaced wheel and axle assemblies having rotors thereon, a pair of side frames spaced from each other and supported by the assemblies, and a bolster interconnecting said side frames, the combination of: a pair of transversely extending beams disposed on opposite sides of the bolster inwardly adjacent said assemblies and having ends resiliently mounted in pockets presented by the respective side frames, a stabilizer bar connected at its ends to the respective beams and extending through the bolster, brake mechanisms supported by the respective beams adjacent and for engagement with the rotors of the respective assemblies, each of said mechanisms comprising an actuating lever, an operating lever operatively connected at its lower end to the actuating lever of each brake mechanism, and a compression rod extending through the bolster and interconnecting the operating levers associated with the respective brake mechanisms intermediate the ends of said operating levers, one of said operating levers being a dead lever fulcrumed at its upper end to an adjacent beam and the other of said operating levers being a live lever operatively connected to a power source located externally of the truck.

2. In a rotor brake arrangement for a railway car truck comprising a pair of side frames interconnected by a bolster and supported by a pair of wheel and axle assemblies each having a rotor, the combination of: a substantially H-shaped brake support comprising a pair of transversely extending beams having their respective ends mounted in pockets of the side frames, and at least one bar interconnecting the respective beams intermediate the ends of said beams, brake means mounted on each beam adjacent a related rotor, a pair of actuating levers connected to the respective brake means, live and dead operating levers disposed on opposite sides of the support and connected at their lower ends to the respective actuating levers, the upper end of one lever being fulcrumed to the truck, the upper end of the other operating lever being connected to a power source, and a compression rod interconnecting the operating levers intermediate their respective ends.

3. In a brake supporting arrangement for a railway car truck including a pair of side frames interconnected by a bolster and supported by a pair of wheel and axle assemblies, flanges formed on the inboard side of the respective side frames and defining pockets therein, a brake support comprising a pair of substantially cylindrical transversely extending beams disposed on opposite sides of the bolster with their ends resiliently mounted in the pockets of the respective side frames, and a bar interconnecting the respective beams intermediate the ends of said beams and operable to transmit braking stresses between the respective beams.

4. In a brake supporting arrangement for a railway car truck having a pair of spaced wheel and axle assemblies, a pair of side frames spaced from each other and supported by the assemblies, and a bolster interconnecting said side frames, the combination of: a pair of inboardly facing flanges formed on each of the side frames and disposed on opposite sides of the bolster, said flanges presenting pockets therein, a pair of transversely extending beams disposed on opposite sides of the bolster and having end portions resiliently mounted in the pockets of the respective side frame flanges, brake means mounted on the respective beams and operable to decelerate the respective assemblies, at least one arm rigidly connected to one beam and resiliently connected to the other beam and operable to transmit the braking torque between the beams.

5. In a rotor brake arrangement for a railway car truck having a pair of spaced wheel and axle assemblies including rotors thereon, a pair of side frames spaced from each other and supported by the assemblies, and a bolster interconnecting said side frames, the combination of: a pair of beams extending transversely of the truck and having their ends resiliently supported in pockets presented by the respective side frames, a pair of brake means mounted on the respective beams at diagonally opposite corners of the truck and engageable with the related rotors, an actuating lever fulcrumed intermediate its ends to each brake means, an operating lever operatively connected to each actuating lever, a compression rod interconnecting the operating levers associated with the respective brake means, a pair of arms interconnecting said beams, each of said torque arms being rigidly connected to one beam adjacent the brake means mounted on said beam and flexibly connected to the other beam and spaced from the brake means mounted on said other beam, one of said operating levers being a dead lever fulcrumed to the truck, the other of said operating levers being a live lever operatively connected to power means located externally of the truck.

6. In a mounting arrangement for a railway car truck brake support, a truck frame presenting on its inboard sides oppositely facing pockets, a transversely extending brake unit supporting beam having at its ends outboardly extending lugs received within said pockets, resilient means disposed to surround said lugs, and independent detachable clip means disposed to surround said resilient means and demountably positioned within said pockets.

7. In a rotor brake arrangement for a railway car truck having a pair of spaced wheel and axle assemblies having rotors thereon, a pair of side frames spaced from each other and supported by the assemblies, and a bolster interconnecting said side frames, the combination of: a brake support comprising a pair of transversely extending beams disposed on opposite sides of the bolster having their opposite ends carried by the respective side frames and interconnected by at least one arm, said arm being rigidly connected at one end thereof to one of said beams and flexibly connected at the other end thereof to the other of said beams, brake means mounted on the respective beams and operable to decelerate the rotors of the respective assemblies, and lever means connecting the respective brake means to each other and to power means located externally of the truck.

8. In a brake arrangement for a railway car truck comprising spaced wheel and axle assemblies having rotatable friction surfaces thereon and a truck frame supported on said assemblies, the combination of a pair of transversely extending beams disposed adjacent respective assemblies, each of said beams having its opposite ends carried by the truck frame, a pair of separate brake mechanisms mounted on the respective beams for engagement with the friction surfaces of the respective assemblies, and means interconnecting the respective beams and operable to transmit braking stresses between the beams.

9. A brake arrangement according to claim 8, wherein said means comprises a bar secured at its ends to the respective beams intermediate the ends of said beams.

10. In a brake arrangement for a railway car truck comprising a truck frame supported on a plurality of spaced wheel and axle assemblies with rotatable friction surfaces thereon, a transversely extending beam disposed adjacent at least one of said assemblies and having its ends supported by the frame, brake means mounted on the beam to engage a related friction surface of an adjacent assembly, an actuating lever connected to said brake means, a support mounted on the beam and spaced from the brake means, said support including a guide in which is disposed said lever, and a spring disposed in said support and reacting between said support and said lever to urge said lever and brake means to an inoperative position.

11. In a rotor brake arrangement for a railway car truck having a pair of spaced wheel and axle assemblies, a pair of side frames spaced from each other and supported by the assemblies, and a bolster interconnecting said side frames, the combination of: a brake supporting comprising a pair of transversely extending beams disposed on opposite sides of the bolster and having opposite ends supported in pockets presented by the respective side frames and interconnected by a pair of arms, and brake means carried by the respective beams for engagement with the respective wheel and axle assemblies, each of said arms having one end rigidly secured to one beam adjacent the brake means mounted on said one beam and having the other end rigidly connected to the other beam at a location spaced from the brake means mounted on said other beam.

12. In a brake arrangement for a railway car truck having a pair of spaced wheel and axle assemblies, a pair of side frames spaced from each other and supported by the assemblies, and a bolster interconnecting said side frames, the combination of: a brake support comprising a pair of transversely extending beams disposed on opposite sides of the bolster and having opposite ends supported in pockets presented by the respective side frames, brake means mounted on the respective beams for engagement with the respective assemblies, and means directly interconnecting said beams comprising at least one arm, said arm having at one end thereof a rigid connection with one of said beams and having at the other end thereof a slot receiving said other beam, a resilient means disposed in said slot between said other beam and said arm, a block disposed in said slot in engagement with said other beam, and wedge means interconnecting said block and said arm and operable to maintain said block in firm engagement with said other beam.

References Cited in the file of this patent

UNITED STATES PATENTS

| | | | |
|---|---|---|---|
| 207,171 | Fink | Aug. 20, | 1878 |
| 609,093 | Gabler | Aug. 16, | 1898 |
| 1,443,838 | Gilpin | Jan. 30, | 1923 |
| 2,174,405 | McCune | Sept. 26, | 1939 |
| 2,286,517 | Tack | June 16, | 1942 |
| 2,347,387 | Aurien | Apr. 25, | 1944 |
| 2,355,120 | Tack | Aug. 8, | 1944 |
| 2,406,440 | Sauer | Aug. 27, | 1946 |
| 2,423,694 | Eksergian et al. | July 8, | 1947 |
| 2,470,237 | Clasen | May 17, | 1949 |
| 2,479,085 | Schrage | Aug. 16, | 1949 |
| 2,481,127 | Ledwinka | Sept. 6, | 1949 |
| 2,673,623 | Coombes | Mar. 30, | 1954 |

FOREIGN PATENTS

| | | | |
|---|---|---|---|
| 467,851 | Canada | Sept. 5, | 1950 |

OTHER REFERENCES

Publication: "Railway Mechanical Engineer," page 88, October 1937.